United States Patent
Kadota et al.

(10) Patent No.: US 9,014,285 B2
(45) Date of Patent: Apr. 21, 2015

(54) RECEIVING APPARATUS AND RECEIVING METHOD

(75) Inventors: Yukihiro Kadota, Tokyo (JP); Takashi Fujiwara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/125,039

(22) PCT Filed: Sep. 5, 2011

(86) PCT No.: PCT/JP2011/070160
§ 371 (c)(1),
(2), (4) Date: Dec. 9, 2013

(87) PCT Pub. No.: WO2013/035146
PCT Pub. Date: Mar. 14, 2013

(65) Prior Publication Data
US 2014/0112416 A1  Apr. 24, 2014

(51) Int. Cl.
*H04L 27/38* (2006.01)
*H04L 27/26* (2006.01)

(52) U.S. Cl.
CPC ............ *H04L 27/38* (2013.01); *H04L 27/2665* (2013.01); *H04L 27/2676* (2013.01)

(58) Field of Classification Search
CPC ............ H04L 27/2663; H04L 27/2665; H04L 27/2662; H04L 27/2655; H04L 27/2659; H04L 27/266
USPC ......... 375/260, 259, 285, 316, 354, 359, 362, 375/364, 365, 340, 342, 346
See application file for complete search history.

(56) References Cited

U.S. PATENT DOCUMENTS

| 7,580,466 B2 | 8/2009 | Ido | |
| 8,837,648 B2 * | 9/2014 | Furudate | 375/346 |

(Continued)

FOREIGN PATENT DOCUMENTS

| EP | 1 441 484 A2 | 7/2004 |
| JP | 10-224319 A | 8/1998 |
| JP | 2003-110519 A | 4/2003 |
| JP | 2004-228853 A | 8/2004 |

(Continued)

OTHER PUBLICATIONS

ARIB STD-B31, "Transmission System for Digital Terrestrial Television Broadcasting", Association of Radio Industries and Businesses, pp. 1-202, Nov. 30, 2005, Version 1.6-E2.

*Primary Examiner* — Siu Lee
(74) *Attorney, Agent, or Firm* — Birch, Stewart, Kolasch & Birch, LLP

(57) ABSTRACT

An object of the present invention is to provide a receiving apparatus and a receiving method capable of preventing phase rotation of a signal after FFT from occurring on a frequency domain. Further, the receiving apparatus according to the present invention is provided with: a window control unit configured to control a position of an FFT window in which FFT is performed to the time domain signal, and output FFT data corresponding to the FFT window; a signal delaying unit configured to generate, from the time domain signal, a plurality of delay signals with different delay amounts; and a signal switching unit having a switch for outputting by switching between two of the time domain signal and the plurality of delay signals based on a predetermined switch timing, the signal switching unit being configured to output the FFT data including the output signal of the switch.

10 Claims, 16 Drawing Sheets

(56) References Cited

U.S. PATENT DOCUMENTS

2008/0101490 A1* 5/2008 Kawauchi et al. ............ 375/260
2010/0118694 A1* 5/2010 Shibata ........................ 370/210
2010/0128822 A1* 5/2010 Ouchi et al. .................. 375/343
2011/0033012 A1* 2/2011 Matsuoka et al. ............ 375/340

FOREIGN PATENT DOCUMENTS

| JP | 3654646 B2 | 6/2005 |
| JP | 4056238 B2 | 3/2008 |
| JP | 2009-225080 A | 10/2009 |
| JP | 2010-22056 A | 1/2010 |

* cited by examiner

F I G . 2
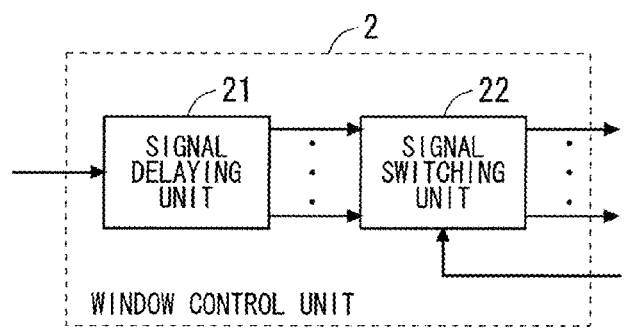
F I G . 3
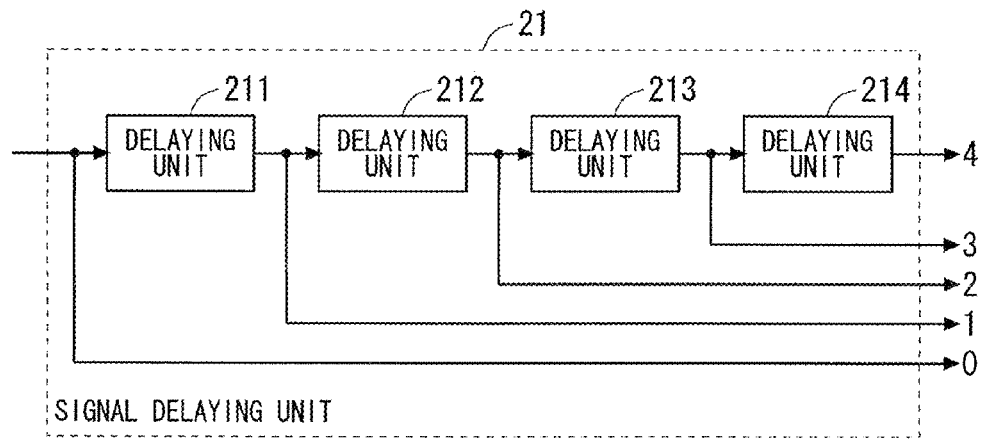

F I G . 9
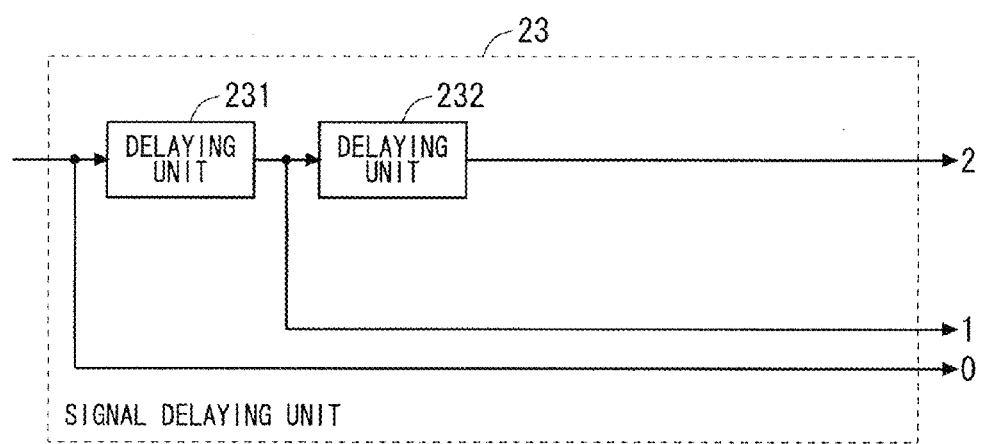

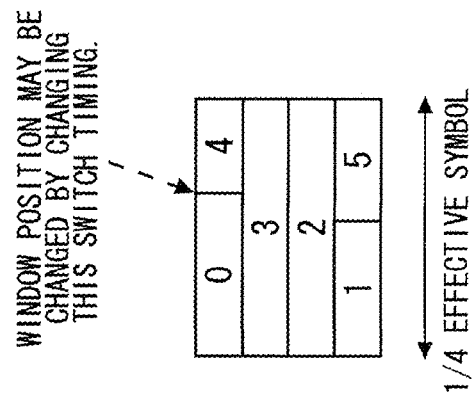
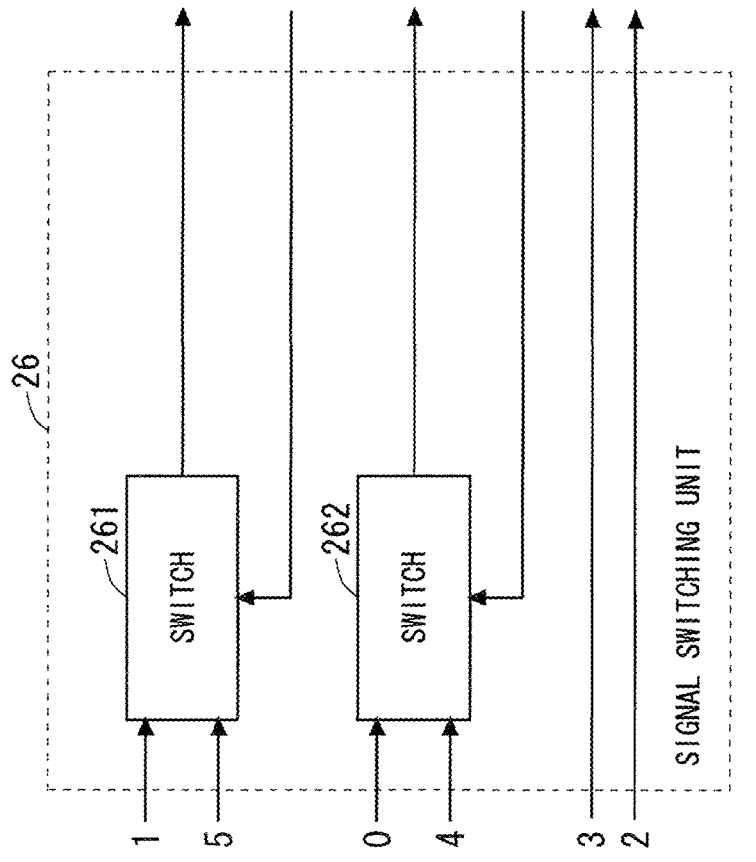
FIG. 14

RECEIVING APPARATUS AND RECEIVING METHOD

TECHNICAL FIELD

The present invention relates to a receiving apparatus and a receiving method for a signal modulated based on an orthogonal frequency division multiplexing (OFDM) method which is an orthogonal frequency-division multiplexing method.

BACKGROUND ART

In recent years, a modulation method known as an orthogonal frequency-division multiplexing (hereinafter also referred to as OFDM) method has been used as a method for transmitting digital signals. The OFDM method is a method of preparing a large number of orthogonal subcarriers within a transmission band, assigning data to amplitude and a phase of each subcarrier, and performing digital modulation by such means as phase shift keying (PSK) or quadrature amplitude modulation (QAM).

An OFDM time domain signal is transmitted in a unit of a symbol called an OFDM symbol (see Non-Patent Document 1, for example). The OFDM symbol is configured by a guard interval and an effective symbol.

By adding a guard interval, regarding a multipath shorter than the guard interval, it is possible to eliminate an influence of the multipath by performing appropriate signal processing on the side of the receiving apparatus (see Patent Documents 1, 2, and 3, for example). Due to such a characteristic, the OFDM method is often employed in digital terrestrial broadcasting that is largely susceptible to multipath interference. Examples of the digital terrestrial broadcasting employing the OFDM method include standards such as digital video broadcasting-terrestrial (DVB-T) and integrated services digital broadcasting-terrestrial (ISDB-T), for example.

PRIOR ART DOCUMENTS

Patent Documents

Patent Document 1: Japanese Patent No. 3740468
Patent Document 2: Japanese Patent No. 4056238
Patent Document 3: Japanese Patent Application Laid-Open No. 2009-225080

Non-Patent Document

Non-Patent Document 1: ARIB STD-B31 Transmission System For Digital Terrestrial Television Broadcasting

SUMMARY OF THE INVENTION

Problems to be Solved by the Invention

It is possible to convert a signal on a time domain into a signal on a frequency domain by performing fast fourier transform (FFT) to a signal of an effective symbol length, as long as the signal is kept within the same OFDM symbol. This is because frequency properties are the same since a guard interval is a copy of an end portion of an effective symbol. With this, even if there is a delay wave within the guard interval due to the multipath, it is possible to similarly convert into the signal on the frequency domain without being influenced by the delay wave, and to decode the converted signal.

However, when receiving transmitted signals while moving, for example, power of a received signal temporally changes to a large extent, and therefore a best suited FFT window position also changes. Further, a frequency property of the transmission channel and a temporal variation in a radio wave environment also change according to a moving environment and a moving speed. By contrast, as described in the aforementioned Patent Documents, controlling the FFT window position in a unit of a data sample of the received signal produces phase rotation by an amount of the movement of the window position, and the phase rotation needs to be corrected when estimating or equating the transmission channel using a plurality of symbols on the frequency domain, and a problem that a circuit size of a phase-rotation correction circuit increases has been posed.

Moreover, there is an approach of finely offsetting a clock frequency to relatively move the position of the FFT window instead of changing the position of the FFT window; however, this has posed a problem that it is not possible to follow a rapid change in transmission channels in reception, for example, when a receiving apparatus is mounted on a car, because only moderate control is possible since increasing an offset width of the clock too much may result in an influence of deviation of the clock frequency.

The present invention has been made in order to address such problems, and aims to provide a receiving apparatus and a receiving method capable of preventing phase rotation of a signal after FFT from occurring on a frequency domain.

Means for Solving the Problems

In order to address the aforementioned problems, a receiving apparatus according to the present invention is a receiving apparatus for receiving an OFDM modulated signal modulated based on an orthogonal frequency division multiplexing (OFDM) method, and generating decoded data obtained by decoding the OFDM modulated signal, the apparatus provided with: a quadrature demodulation unit configured to receive a signal obtained by converting the OFDM modulated signal into a predetermined frequency band, and perform quadrature demodulation on a time domain of the OFDM modulated signal to output a time domain signal; a window control unit configured to control a position of an FFT window in which fast fourier transform (FFT) is performed to the time domain signal outputted from the quadrature demodulation unit, and output FFT data corresponding to the FFT window; an FFT unit configured to perform FFT to the FFT data outputted from the window control unit, and output frequency domain data; and a data decoding unit configured to decode the frequency domain data outputted from the FFT unit, wherein the window control unit includes: a signal delaying unit configured to generate, from the time domain signal, a plurality of delay signals with different delay amounts; and a signal switching unit having a switch for outputting by switching between two signals different in delay amount by a single effective symbol in the time domain signal and the plurality of delay signals based on a predetermined switch timing, the signal switching unit being configured to output the FFT data including the output signal of the switch.

Effects of the Invention

According to the present invention, it is possible to prevent phase rotation of a signal after FFT from occurring on the frequency domain, since being provided with: a quadrature demodulation unit configured to receive a signal obtained by converting the OFDM modulated signal into a predetermined frequency band, and perform quadrature demodulation on a time domain of the OFDM modulated signal to output a time domain signal; a window control unit configured to control a position of an FFT window in which fast fourier transform (FFT) is performed to the time domain signal outputted from the quadrature demodulation unit, and output FFT data corresponding to the FFT window; an FFT unit configured to perform FFT to the FFT data outputted from the window control unit, and output frequency domain data; and a data decoding unit configured to decode the frequency domain data outputted from the FFT unit, and the window control unit includes: a signal delaying unit configured to generate, from the time domain signal, a plurality of delay signals with different delay amounts; and a signal switching unit having a switch for outputting by switching between two signals different in delay amount by a single effective symbol in the time domain signal and the plurality of delay signals based on a predetermined switch timing, the signal switching unit being configured to output the FFT data including the output signal of the switch.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a diagram illustrating one example of a configuration of a window control unit according to the embodiment 1 of the present invention.

FIG. 3 is a diagram illustrating one example of a configuration of a signal delaying unit according to the embodiment 1 of the present invention.

FIG. 9 is a diagram illustrating one example of a configuration of a signal delaying unit according to an embodiment 4 of the present invention.

FIG. 14 is a diagram illustrating one example of a configuration of a signal switching unit according to the embodiment 5 of the present invention.

DESCRIPTION OF EMBODIMENTS

Hereinafter, embodiments of the present invention will be described with reference to the drawings.

First, a technique constituting a premise of the present invention will be described.

<Technical Premise>

Figure 17:
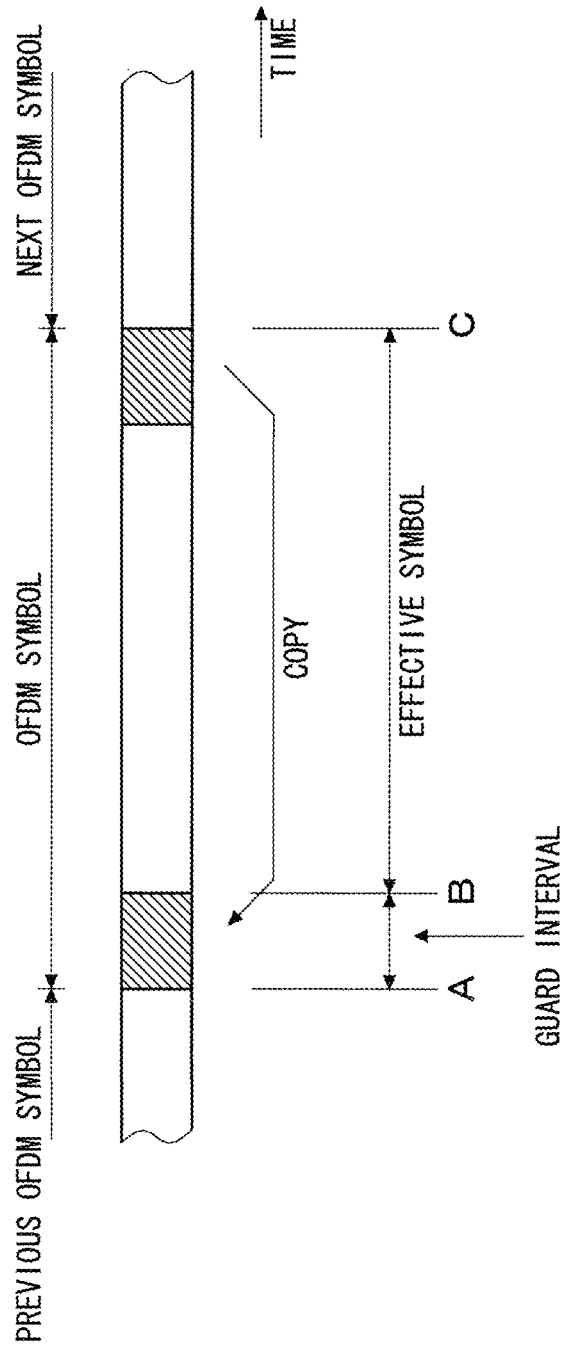
FIG. 17 is a diagram illustrating one example of a configuration of an OFDM symbol.

FIG. 17 is a diagram illustrating one example of a configuration of an OFDM symbol. As illustrated in FIG. 17, a range indicated by an arrow "OFDM symbol" represents a interval covered by a single OFDM symbol. Further, a single OFDM symbol is configured by a guard interval (a interval from A to B in FIG. 17) and an effective symbol (a interval from B to C in FIG. 17). The guard interval is a copy of an end portion of a waveform of the effective symbol of a predetermined proportion (a hatched part in FIG. 17) added to a position immediately before (that is, at the beginning of) the effective symbol. By adding a guard interval, regarding a multipath shorter than the guard interval, it is possible to eliminate an influence of the multipath by performing appropriate signal processing on the side of a receiving apparatus (see Patent Documents 1, 2, and 3, for example).

However, as described above, when receiving transmitted signals while moving, for example, controlling the FFT window position in a unit of a data sample of the received signals produces phase rotation by an amount of the movement of the window position, and thus has posed a problem that, since the phase rotation needs to be corrected when estimating or equating the transmission channel using a plurality of symbols on the frequency domain, a circuit size of a phase-rotation correction circuit increases.

The present invention has been made in order to address such a problem, details of which will be described below.

Embodiment 1

Figure 1:
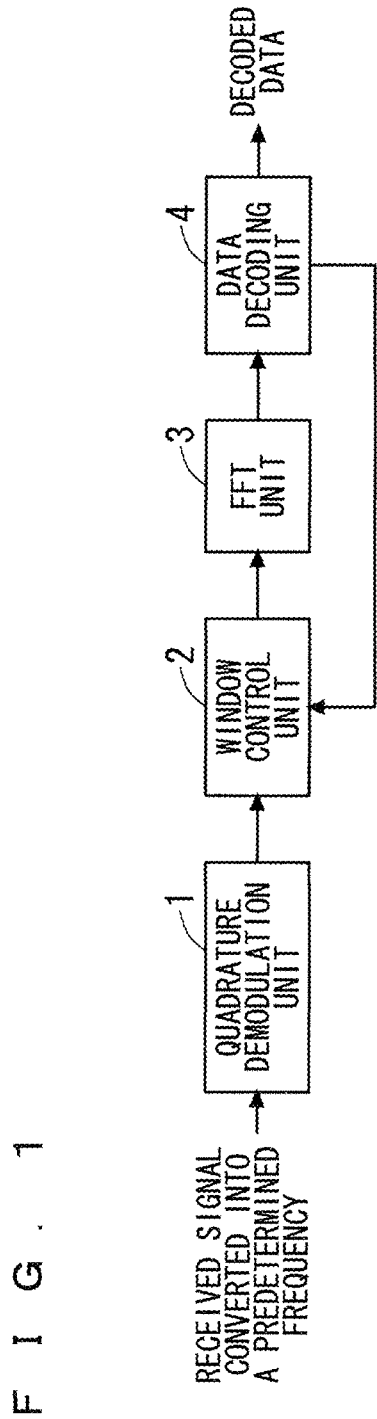
FIG. 1 is a block diagram of a receiving apparatus according to an embodiment 1 of the present invention.

FIG. 1 is a block diagram of a receiving apparatus according to an embodiment 1 of the present invention. As illustrated in FIG. 1, the receiving apparatus according to the embodiment 1 is a receiving apparatus for receiving an OFDM modulated signal modulated based on an OFDM method, and generating decoded data obtained by decoding the OFDM modulated signal, and provided with: a quadrature demodulation unit 1 configured to receive a signal obtained by converting the OFDM modulated signal into a predetermined frequency band, and perform quadrature demodulation on a time domain of the OFDM modulated signal to output a time domain signal; a window control unit 2 configured to control a position of an FFT window in which FFT is performed to the time domain signal outputted from the quadrature demodulation unit 1, and output FFT data corresponding to the FFT window; an FFT unit 3 configured to perform FFT to the FFT data outputted from the window control unit 2, and output frequency domain data; and a data decoding unit 4 configured to decode the frequency domain data outputted from the FFT unit 3.

Next, an operation will be described. The quadrature demodulation unit 1 performs the quadrature demodulation on a time domain taking a received signal resulted from converting a signal received by a tuner into a predetermined frequency band as an input, and outputs a time domain signal. It should be noted that in the present invention, a method of the quadrature demodulation is unprescribed, and detailed description is omitted here as being a prior art.

The window control unit 2 controls an FFT window in which the FFT is performed by the following FFT unit 3, and determines an ideal FFT window position by using a signal obtained on the frequency domain, for example, such as S/N of a pilot signal, by performing inverse fast fourier transform (IFFT) on the frequency domain to obtain a position of a dominant wave on the time domain from a delay profile, or by using an error rate.

FIG. 2 is a diagram illustrating one example of a configuration of the window control unit 2 according to the embodiment 1. As illustrated in FIG. 2, the window control unit 2 is provided with: a signal delaying unit 21 configured to generate, from the time domain signal, a plurality of delay signals with different delay amounts; and a signal switching unit 22 having a switch 221 (see FIG. 4) for outputting by switching between two of the time domain signal and the plurality of delay signals based on a predetermined switch timing, and configured to output the FFT data including the output signal from the switch 221.

Next, an operation of the window control unit 2 will be described. The signal delaying unit 21 receives the time domain signal outputted from the quadrature demodulation unit 1, and generates a delay signal obtained by delaying the time domain signal. A plurality of delay signals with different delay amounts generated by the signal delaying unit 21 are inputted into the signal switching unit 22. The signal switching unit 22 determines a switching position (switch timing) of a signal for determining a position of an FFT window in which the FFT is performed based on data of the data decoding unit 4.

FIG. 3 is a diagram illustrating one example of a configuration of the signal delaying unit 21 according to the embodiment 1. As illustrated in FIG. 3, the signal delaying unit 21 is provided with a plurality of series-connected delaying units 211-214 configured to respectively output the plurality of delay signals, and the plurality of delay signals outputted from the signal delaying unit 21 are inputted into the signal switching unit 22. It should be noted that the delaying units 211-214 may be configured, for example, by memories or the like.

Figure 6:
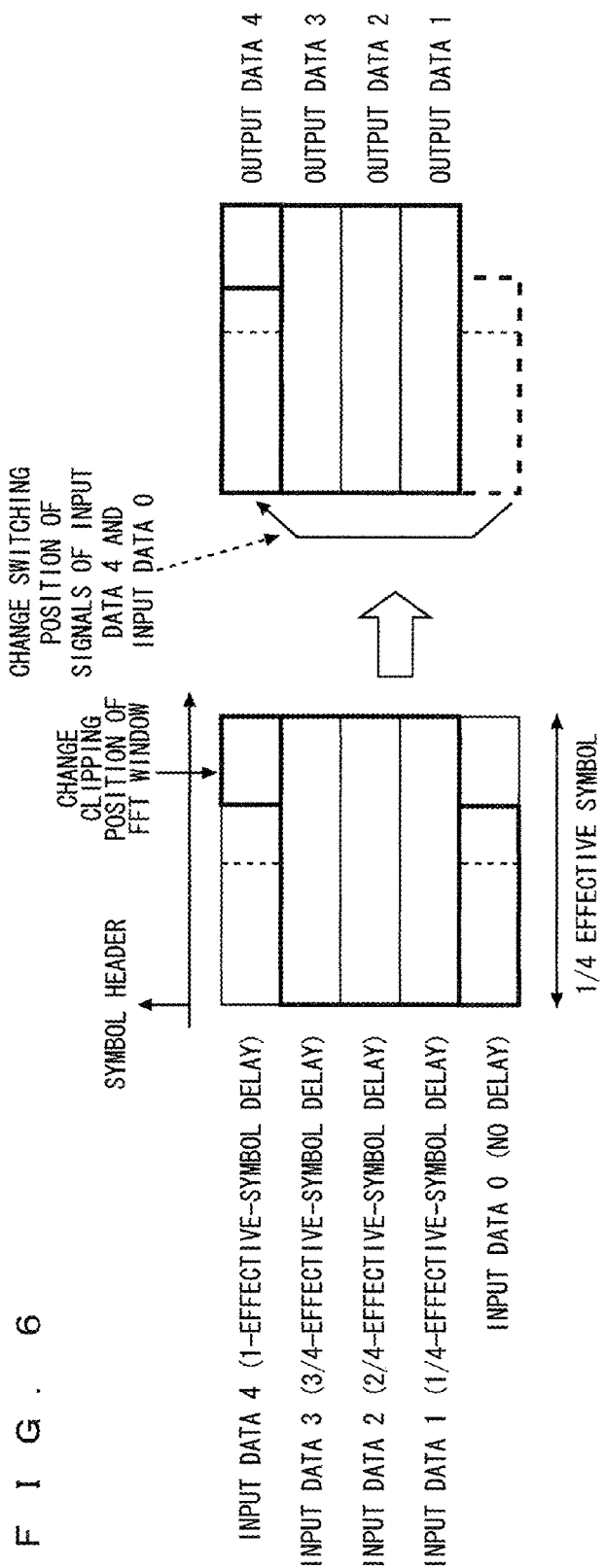
FIG. 6 is a diagram illustrating an operation of the window control unit according to the embodiment 1 of the present invention, where a clipping position of an FFT window is altered.

Next, an operation of the signal delaying unit 21 will be described. The time domain signal outputted from the quadrature demodulation unit 1 is inputted, the delaying units 211-214 of the same delay amount are connected in series, and four signals (delay signals) with different delay amounts (signals 1-4) are generated respectively by the delaying units 211-214. It should be noted that a delay amount between the delaying units 211-214 is ¼ effective symbol length. The four delay signals (signals 1-4) and the input signal (signal 0, time domain signal) that does not pass through the delaying units 211-214 are outputted as they are, and total five signals indicated by 0-4 in FIG. 6 are outputted.

Figure 4:
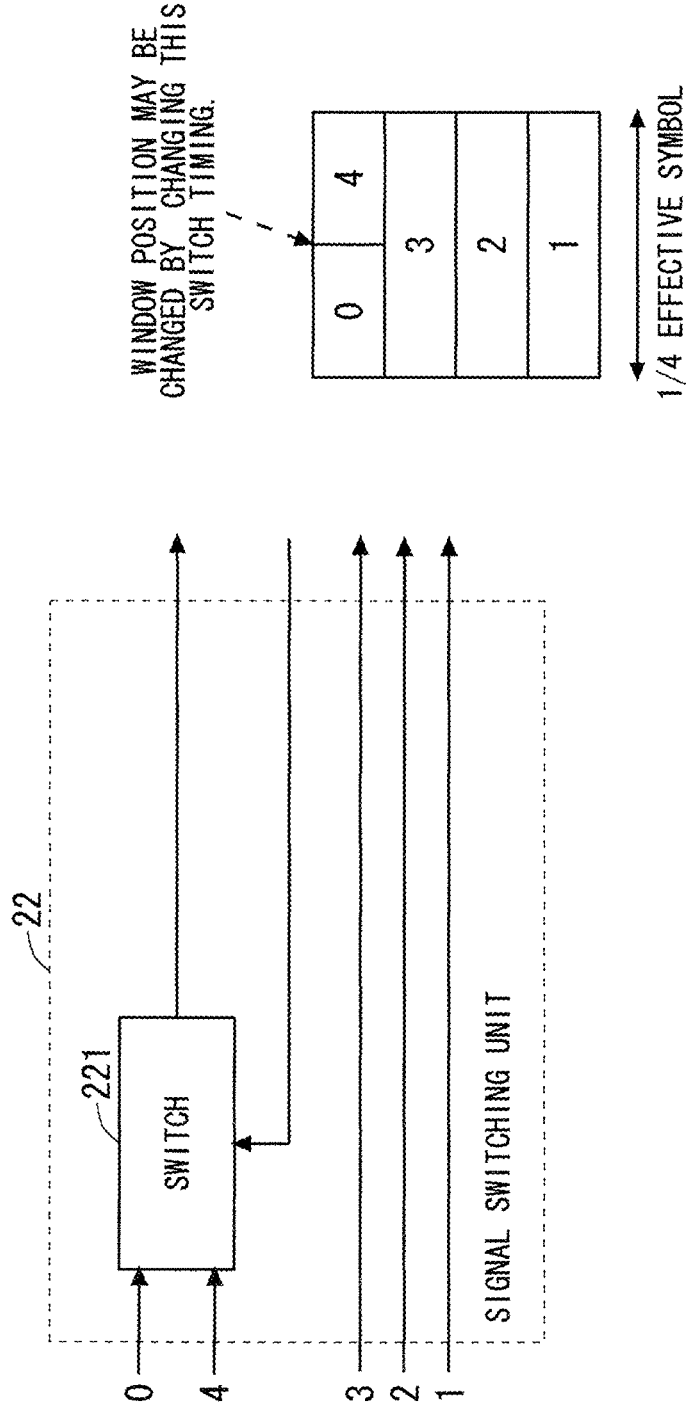
FIG. 4 is a diagram illustrating one example of a configuration of a signal switching unit according to the embodiment 1 of the present invention.

FIG. 4 is a diagram illustrating one example of a configuration of the signal switching unit 22 according to the embodiment 1. As illustrated in FIG. 4, the signal switching unit 22 is provided with the aforementioned switch 221, and an output from the signal switching unit 22 corresponds to the output from the window control unit 2.

Next, an operation of the signal switching unit 22 will be described. Input signals 0-4 shown in FIG. 4 correspond to the output signals 0-4 from the signal delaying unit 21 shown in FIG. 3. As illustrated in FIG. 4, at the switch 221, the signal 0 and the signal 4 are switched and outputted based on data inputted from the data decoding unit 4. Specifically, the switch 221 outputs by switching between the time domain signal and the delay signal that is delayed from this time domain signal by a single effective symbol. By changing timing of the switching, it is possible to change the position of the FFT window. Further, the input signals 1-3 are outputted as they are.

Figure 5:
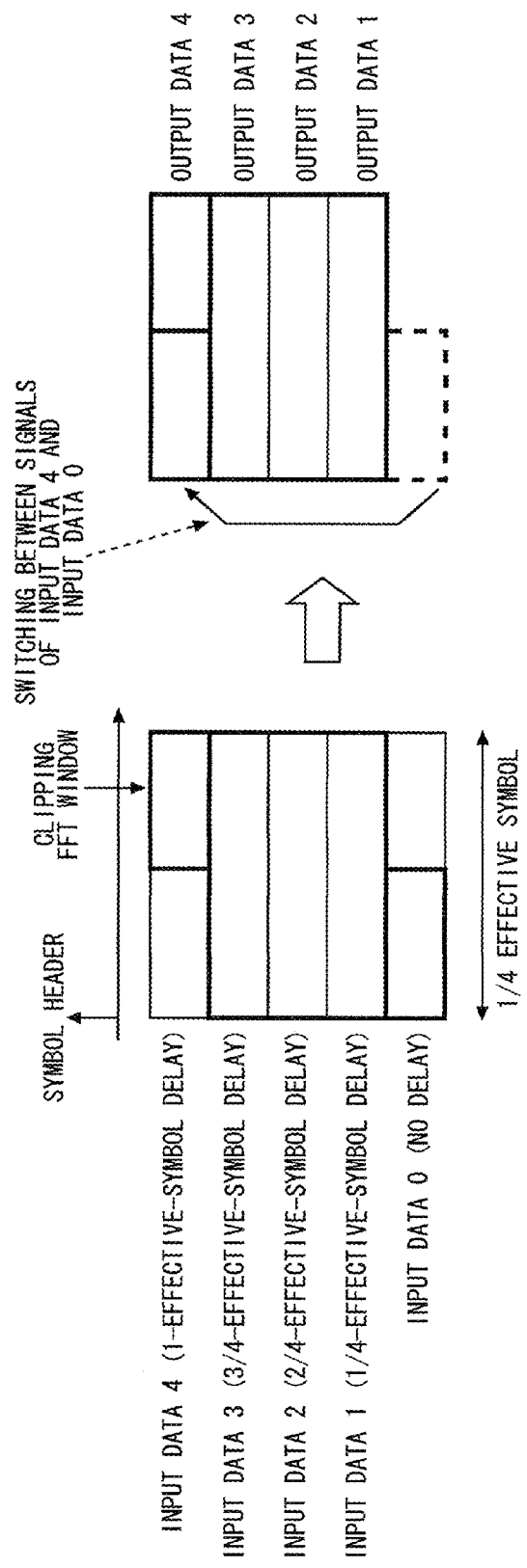
FIG. 5 is a diagram illustrating an operation of the window control unit according to the embodiment 1 of the present invention.

Next, an operation of the switch 221 will be described. FIG. 5 is a diagram illustrating the operation of the window control unit 2 according to the embodiment 1. As illustrated in FIG. 5, input data 0 (no delay), input data 1 (¼-effective-symbol delay), input data 2 (²⁄₄-effective-symbol delay), input data 3 (¾-effective-symbol delay), and input data 4 (1-effective-symbol delay) correspond respectively to the signals 0-4 shown in FIGS. 3 and 4. A left side of the diagram in FIG. 5 shows the outputs from the signal delaying unit 21 in FIG. 3. A right side of the diagram in FIG. 5 shows the delay signals outputted from the signal delaying unit 21 switched by the signal switching unit 22. Here, a signal of the input data 0 is moved before the input signal 4. At this time, a boundary between the input data 0 and the input data 4 becomes a signal switching position. Such signals (signals shown on the right side in FIG. 5) are outputted from the signal switching unit 22 (that is, the window control unit 2) as FFT data corresponding to the FFT window, and inputted to the FFT unit 3.

FIG. 6 is a diagram illustrating the operation of the window control unit 2 according to the embodiment 1, where a clipping position of an FFT window is altered. As illustrated in FIG. 6, the signal of the input data 0 is slightly longer, and a signal of the input data 4 is slightly shorter. Specifically, since the switching position between the input data 0 and the input data 4 has temporally moved backward, the position of the FFT window is moved. However, since a position of a symbol header (a reference point of the FFT window) does not change, phase rotation does not occur on the frequency domain. As described above, the window control unit 2 controls the position of the FFT window using as a reference the symbol header indicating the beginning of a predetermined symbol included in the time domain signal.

The FFT unit 3 performs the FFT to a signal (FFT data) resulted from recombination of output data 4, output data 3, output data 2, and output data 1 in order from the beginning shown on the right side of FIGS. 5 and 6. Therefore, in the receiving apparatus according to the embodiment 1, the FFT window may be moved by ±⅛ effective symbol.

From the aforementioned description, by providing the signal delaying unit immediately before the FFT unit, generating a plurality of delay signals for a single OFDM symbol on the time domain symbol by the signal delaying unit, and changing the switching positions of the plurality of delay signals, it is possible to move the FFT window without changing the reference position of the FFT (symbol header), and to prevent the phase rotation from occurring on the frequency domain. Further, since the phase rotation does not occur, a phase-rotation correction circuit is not required in the frequency domain after the FFT. Moreover, it is possible to reduce a circuit size since a phase-rotation correction circuit is not required. In addition, the signal delaying unit commonly employs a method of making correlation with a signal delayed by a single effective symbol to obtain an FFT reference point by its nature, and since a memory used for this purpose may be shared, it is not necessary to increase (add) a delaying unit (e.g., memory).

Embodiment 2

Figure 7:
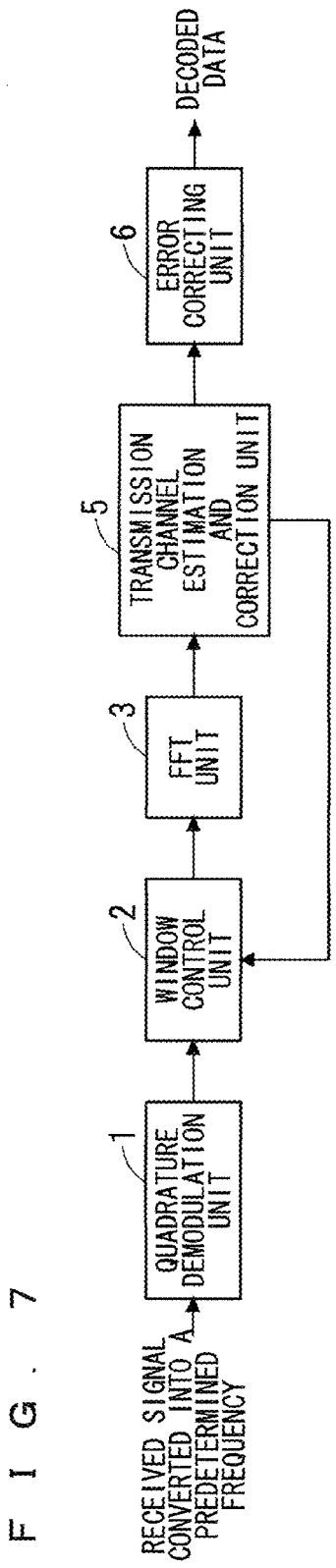
FIG. 7 is a block diagram of a receiving apparatus according to an embodiment 2 of the present invention.

FIG. 7 is a block diagram of a receiving apparatus according to an embodiment 2. As illustrated in FIG. 7, the receiving apparatus according to the embodiment 2 is a receiving apparatus is characterized by including: a transmission channel estimation and correction unit 5 (transmission channel estimation unit) configured to estimate distortion of an OFDM modulated signal produced in a transmission channel based on the frequency domain data outputted from the FFT unit 3; and an error correcting unit 6 configured to correct an error of the OFDM modulated signal and output decoded data, wherein the window control unit 2 controls the switch timing based on a result estimated by the transmission channel estimation and correction unit 5. Other configurations and operations are the same as those of the embodiment 1, and description therefor shall be omitted.

The window control unit 2 controls an FFT window in which the FFT is performed by the following FFT unit 3, and determines an ideal FFT window position by using a signal obtained on the frequency domain, for example, such as S/N of a pilot signal, or by performing a IFFT on the frequency domain to obtain a position of a dominant wave on the time domain from a delay profile.

Next, an operation of the window control unit 2 will be described (see FIG. 2). The signal delaying unit 21 receives the time domain signal outputted from the quadrature demodulation unit 1, and generates a delay signal obtained by delaying the time domain signal. A plurality of delay signals with different delay amounts generated by the signal delaying unit 21 are inputted into the signal switching unit 22. The signal switching unit 22 determines a switching position (switch timing) of a signal for determining a position of an FFT window in which the FFT is performed based on the result estimated by the transmission channel estimation and correction unit 5.

Next, an operation of the signal switching unit 22 will be described (see FIG. 4). As illustrated in FIG. 4, at the switch 221, the signal 0 and the signal 4 are switched and outputted based on the result estimated by the transmission channel estimation and correction unit 5. By changing timing of the switching, it is possible to change the position of the FFT window.

From the aforementioned description, the receiving apparatus according to the embodiment 2 provides the same effects as those of the embodiment 1 by controlling the switch timing based on the result estimated by the transmission channel estimation and correction unit 5.

Embodiment 3

Figure 8:
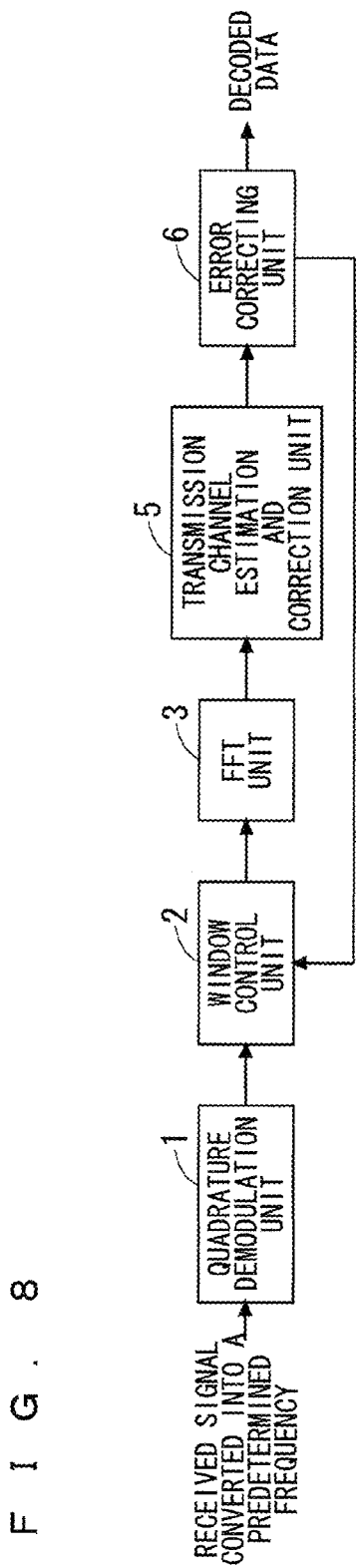
FIG. 8 is a block diagram of a receiving apparatus according to an embodiment 3 of the present invention.

FIG. 8 is a block diagram of a receiving apparatus according to an embodiment 3. As illustrated in FIG. 8, the receiving apparatus according to the embodiment 3 is characterized in that the window control unit 2 controls the switch timing based on a correction amount obtained by the error correcting unit 6. Other configurations and operations are the same as those of the embodiment 2, and description therefor shall be omitted.

The window control unit 2 controls an FFT window in which the FFT is performed by the following FFT unit 3, and determines an ideal FFT window position so as to minimize an error rate (correction amount) obtained by the error correcting unit 6.

Next, an operation of the window control unit 2 will be described (see FIG. 2). The signal delaying unit 21 receives the time domain signal outputted from the quadrature demodulation unit 1, and generates a delay signal obtained by delaying the time domain signal. A plurality of delay signals with different delay amounts generated by the signal delaying unit 21 are inputted into the signal switching unit 22. The signal switching unit 22 determines a switching position (switch timing) of a signal for determining a position of an FFT window in which the FFT is performed based on the error rate (correction amount) and such obtained by the error correcting unit 6.

Next, an operation of the signal switching unit 22 will be described (see FIG. 4). As illustrated in FIG. 4, at the switch 221, the signal 0 and the signal 4 are switched and outputted based on the correction amount obtained by the error correcting unit 6. By changing timing of the switching, it is possible to change the position of the FFT window.

From the aforementioned description, the receiving apparatus according to the embodiment 3 provides the same effects as those of the embodiments 1 and 2 by controlling the switch timing based on the error rate (correction amount) and such obtained by the error correcting unit 6.

Embodiment 4

The embodiments 1-3 have described the case in which the four delaying units 211-214 are provided as illustrated in FIG. 3, and the delay amount between the delaying units 211-214 is ¼ effective symbol. In an embodiment 4, a case is described in which two delaying units 231 and 232 are provided as illustrated in FIG. 9, and the delay amount between the delaying units 231 and 232 is ½ effective symbol. A receiving apparatus according to the embodiment 4 is characterized by the window control unit 2; other configurations and operations are the same as those of the receiving apparatuses according to the embodiments 1-3 (FIGS. 1, 7, and 8), and description therefor shall be omitted.

FIG. 9 is a diagram illustrating one example of a configuration of a signal delaying unit 23 according to the embodiment 4. As illustrated in FIG. 9, the signal delaying unit 23 is provided with the two series-connected delaying units 231 and 232 configured to respectively output a plurality of delay signals, and three delay signals outputted from the signal delaying unit 23 (signals 0-2) are inputted into a signal switching unit 24. It should be noted that the delaying units 231 and 232 may be configured, for example, by memories or the like.

Next, an operation of the signal delaying unit 23 will be described. The time domain signal outputted from the quadrature demodulation unit 1 is inputted, the delaying units 231 and 232 of the same delay amount are connected in series, and two signals (delay signals) with different delay amounts (signals 1 and 2) are generated respectively by the delaying units 231 and 232. It should be noted that a delay amount between the delaying units 231 and 232 is ½ effective symbol length. The two delay signals and the input signal (signal 0, time domain signal) that does not pass through the delaying units 231 and 232 are outputted as they are, and total three signals indicated by 0-2 in FIG. 9 are outputted.

Figure 10:
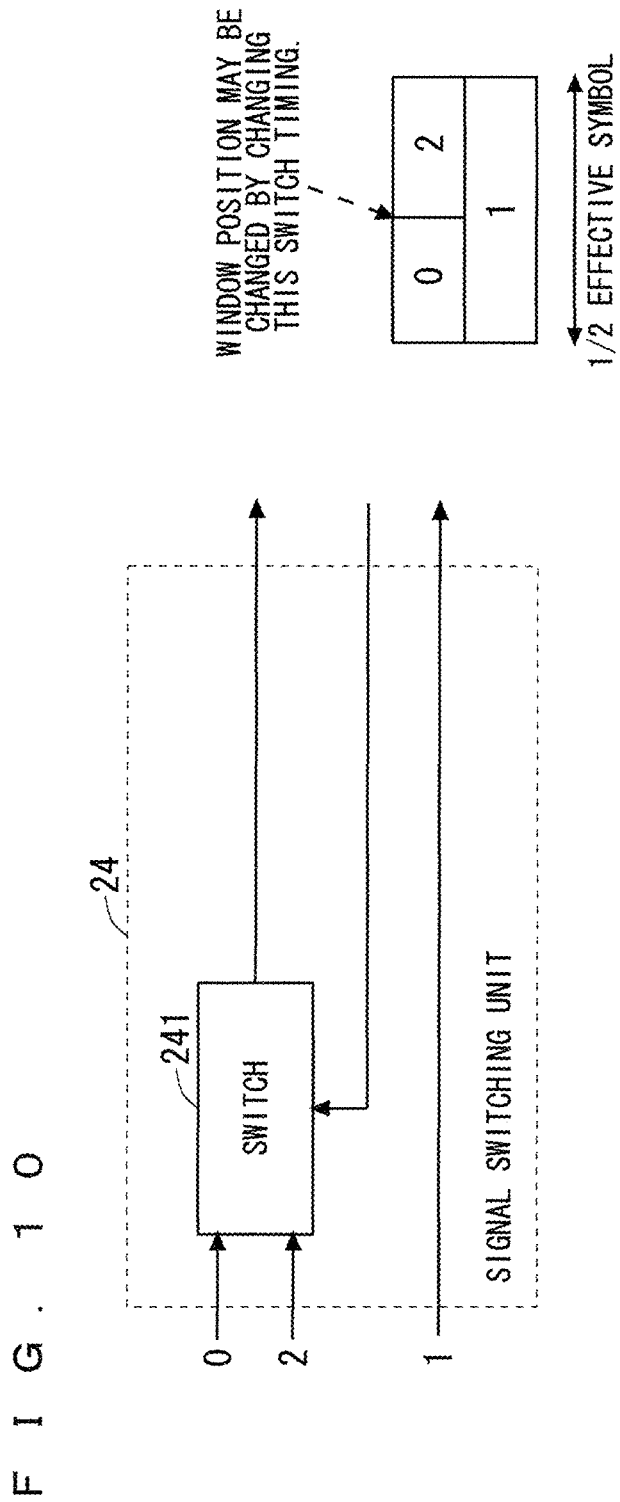
FIG. 10 is a diagram illustrating one example of a configuration of a signal switching unit according to the embodiment 4 of the present invention.

FIG. 10 is a diagram illustrating one example of a configuration of the signal switching unit 24 according to the embodiment 4. As illustrated in FIG. 10, the signal switching unit 24 is provided with a switch 241, and an output from the signal switching unit 24 corresponds to the output from the window control unit 2.

Next, an operation of the signal switching unit 24 will be described. The input signals 0-2 shown in FIG. 10 correspond to the output signals 0-2 from the signal delaying unit 23 shown in FIG. 9. As illustrated in FIG. 10, at the switch 241, the signal 0 and the signal 2 are switched and outputted. Specifically, the switch 241 outputs by switching between the time domain signal and the delay signal that is delayed from this time domain signal by a single effective symbol. By changing timing of the switching, it is possible to change the position of the FFT window. Further, the input signal 1 is outputted as it is.

Figure 11:
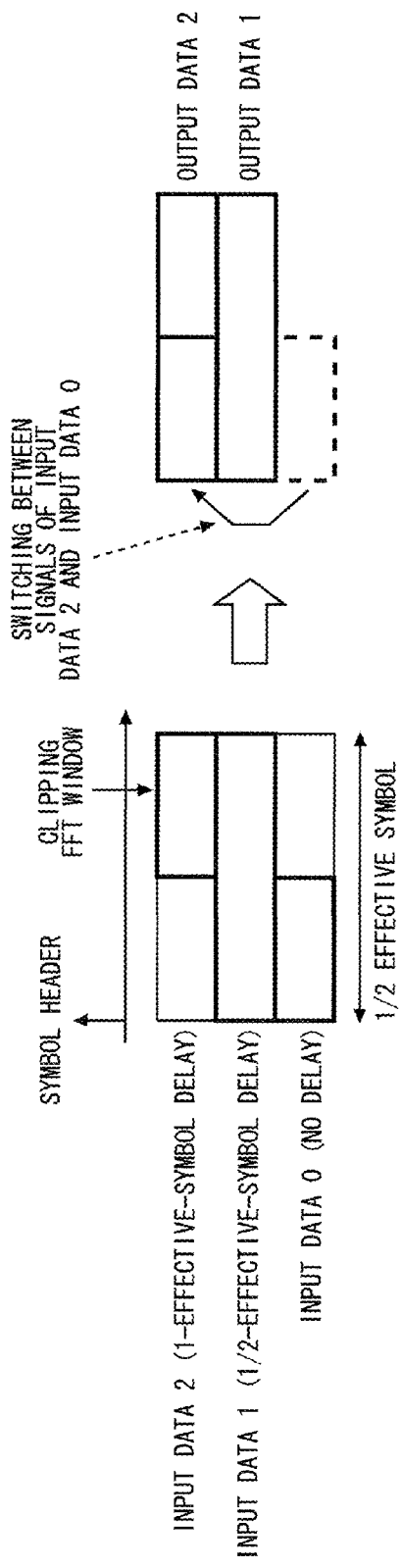
FIG. 11 is a diagram illustrating an operation of a window control unit according to the embodiment 4 of the present invention.

Next, an operation of the switch 241 will be described. FIG. 11 is a diagram illustrating the operation of the window control unit 2 according to the embodiment 4. As illustrated in FIG. 11, input data 0 (no delay), input data 1 (½-effective-symbol delay), and input data 2 (1-effective-symbol delay) correspond respectively to the signals 0-2 shown in FIGS. 9 and 10. A left side of the diagram in FIG. 11 shows the outputs from the signal delaying unit 23 in FIG. 9. A right side of the diagram in FIG. 11 shows the delay signals outputted from the signal delaying unit 23 switched by the signal switching unit 24. Here, a signal of the input data 0 is moved before the input signal 2. At this time, a boundary between the input data 0 and the input data 2 becomes a signal switching position. Such signals (signals shown on the right side in FIG. 11) are outputted from the signal switching unit 24 (that is, the window control unit 2) as FFT data corresponding to the FFT window, and inputted to the FFT unit 3.

Figure 12:
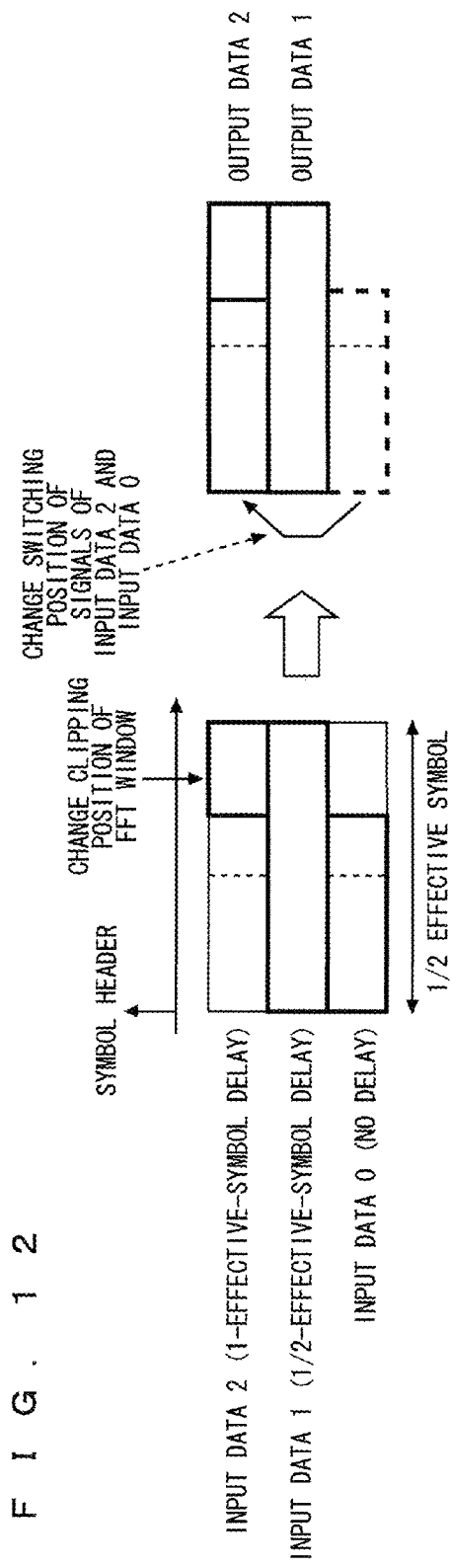
FIG. 12 is a diagram illustrating an operation of the window control unit according to the embodiment 4 of the present invention, where a clipping position of an FFT window is altered.

FIG. 12 is a diagram illustrating an operation of the window control unit 2 according to the embodiment 4, where a clipping position of an FFT window is altered. As illustrated in FIG. 12, the signal of the input data 0 is slightly longer, and a signal of the input data 2 is slightly shorter. Specifically, since the switching position between the input data 0 and the input data 2 has temporally moved backward, the position of the FFT window is moved. However, since a position of a symbol header (a reference point of the FFT window) does not change, phase rotation does not occur on the frequency domain. As described above, the window control unit 2 controls the position of the FFT window using as a reference the symbol header indicating the beginning of a predetermined symbol included in the time domain signal.

The FFT unit 3 performs the FFT to a signal (FFT data) resulted from recombination of output data 2 and output data 1 in order from the beginning shown on the right side of FIGS. 11 and 12. Therefore, in the receiving apparatus according to the embodiment 4, the FFT window may be moved by ±¼ effective symbol.

From the aforementioned description, the receiving apparatus according to the embodiment 4 may provide the same effects as those of the embodiments 1-3.

Embodiment 5

Figure 13:
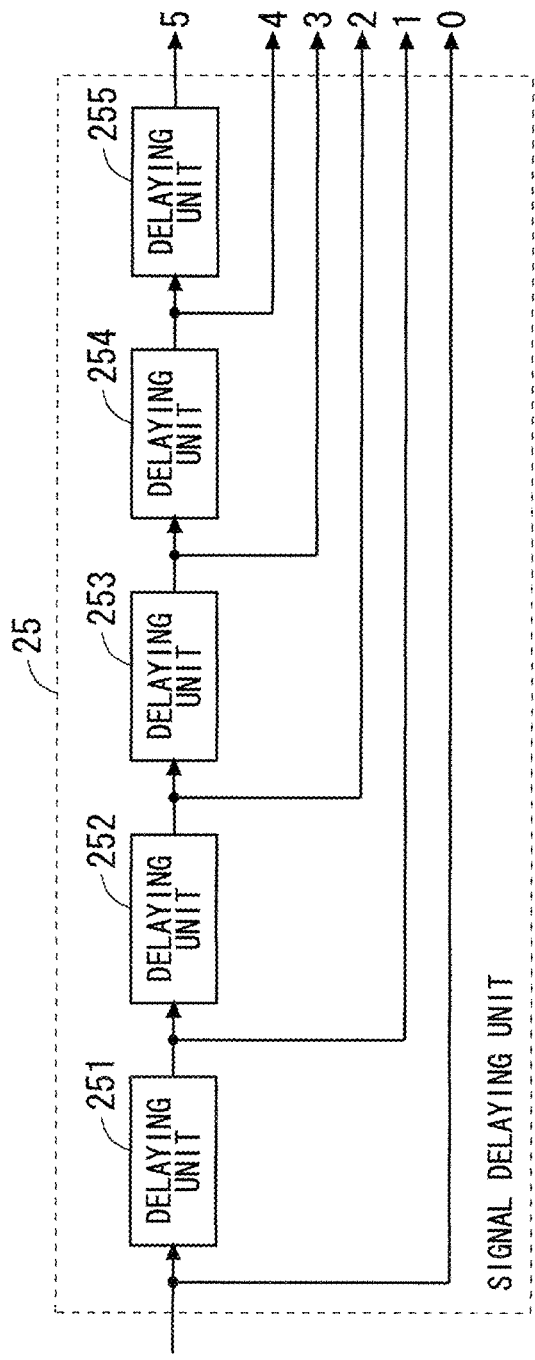
FIG. 13 is a diagram illustrating one example of a configuration of a signal delaying unit according to an embodiment 5 of the present invention.

The embodiments 1-3 have described the case in which the four delaying units 211-214 are provided as illustrated in FIG. 3, and the delay amount between the delaying units 211-214 is ¼ effective symbol. In an embodiment 5, a case is described in which five delaying units 251-255 are provided as illustrated in FIG. 13, and the delay amount between the delaying units 251-255 is ¼ effective symbol. A receiving apparatus according to the embodiment 5 is characterized by the window control unit 2; other configurations and operations are the same as those of the receiving apparatuses according to the embodiments 1-4 (FIGS. 1, 7, and 8), and description therefor shall be omitted.

FIG. 13 is a diagram illustrating one example of a configuration of a signal delaying unit 25 according to the embodiment 5. As illustrated in FIG. 13, the signal delaying unit 25 is provided with the five series-connected delaying units 251-255 configured to respectively output a plurality of delay signals, and six delay signals outputted from the signal delaying unit 25 (signals 0-5) are inputted into a signal switching unit 26. It should be noted that the delaying units 251-255 may be configured, for example, by memories or the like.

Next, an operation of the signal delaying unit 25 will be described. The time domain signal outputted from the quadrature demodulation unit 1 is inputted, the delaying units 251-255 of the same delay amount are connected in series, and five signals (delay signals) with different delay amounts (signals 1-5) are generated respectively by the delaying units 251-255. It should be noted that a delay amount between the delaying units 251-255 is ¼ effective symbol length. The five delay signals and the input signal (signal 0, time domain signal) that does not pass through the delaying units 251-255 are outputted as they are, and total six signals indicated by 0-5 in FIG. 13 are outputted.

FIG. 14 is a diagram illustrating one example of a configuration of the signal switching unit 26 according to the embodiment 5. As illustrated in FIG. 14, the signal switching unit 26 is provided with switches 261 and 262, and an output from the signal switching unit 26 corresponds to the output from the window control unit 2.

Next, an operation of the signal switching unit 26 will be described. The input signals 0-5 shown in FIG. 14 correspond to the output signals 0-5 from the signal delaying unit 25 shown in FIG. 13. As illustrated in FIG. 14, at the switch 261, the signal 1 and the signal 5 are switched and outputted, and at the switch 262, the signal 0 and the signal 4 are switched and outputted. Specifically, the switch 261 outputs by switching between the two delay signals different in delay amount by a single effective symbol, and the switch 262 outputs by switching between the time domain signal and the delay signal that is delayed from this time domain signal by a single effective symbol. By changing timings of the switching, it is possible to change the position of the FFT window. Further, the input signals 2 and 3 are outputted as they are.

Figure 15:
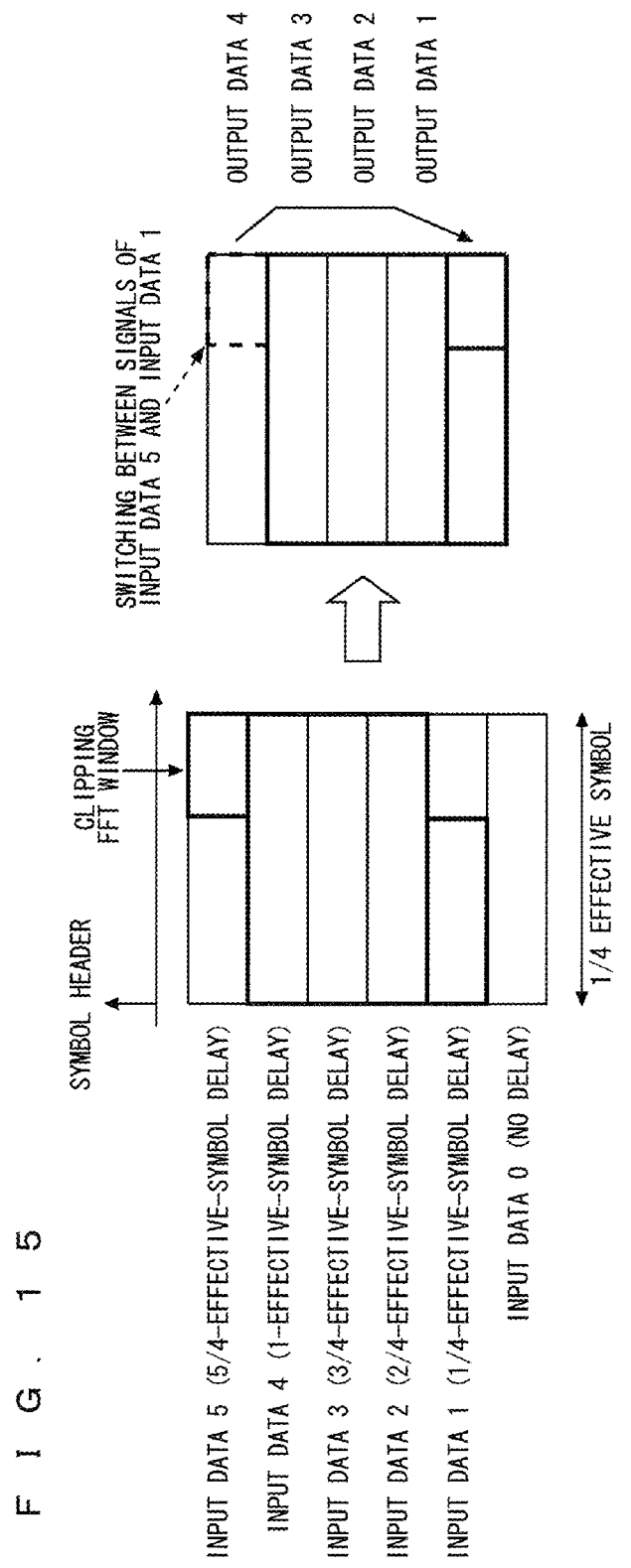
FIG. 15 is a diagram illustrating an operation of a window control unit according to the embodiment 5 of the present invention.

Next, an operation of the switch 261 will be described. FIG. 15 is a diagram illustrating the operation of the window control unit 2 according to the embodiment 5. As illustrated in FIG. 15, input data 0 (no delay), input data 1 (¼-effective-symbol delay), input data 2 (²⁄₄-effective-symbol delay), input data 3 (¾-effective-symbol delay), input data 4 (1-effective-symbol delay), and input data 5 (⁵⁄₄-effective-symbol delay) correspond respectively to the signals 0-5 shown in FIGS. 13 and 14. A left side of the diagram in FIG. 15 shows the outputs from the signal delaying unit 25 in FIG. 13. A right side of the diagram in FIG. 15 shows the delay signals outputted from the signal delaying unit 25 switched by the switch 261 of the signal switching unit 26. Here, a signal of the input data 5 is moved behind the input signal 1. At this time, a boundary between the input data 1 and the input data 5 becomes a signal switching position, and allows forward movement of the position of the FFT window. Such signals (signals shown on the right side in FIG. 15) are outputted from the signal switching unit 26 (that is, the window control unit 2) as FFT data corresponding to the FFT window, and inputted to the FFT unit 3.

Figure 16:
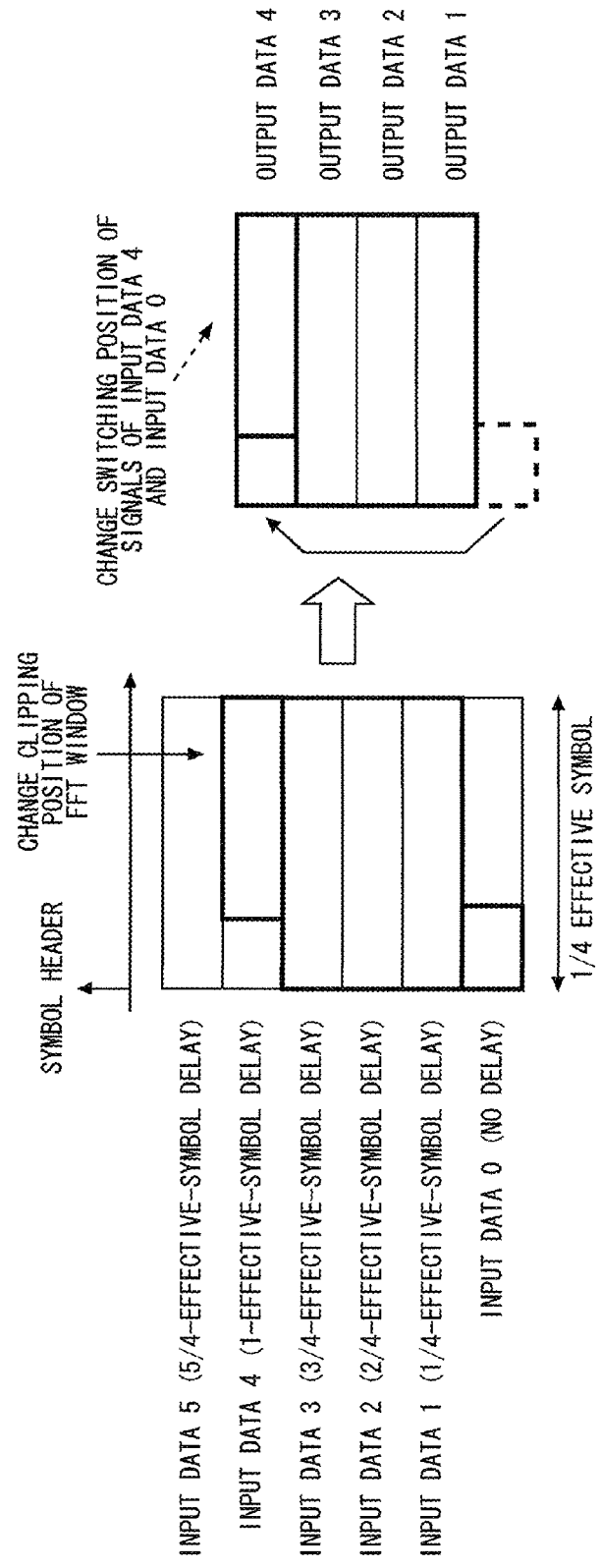
FIG. 16 is a diagram illustrating an operation of the window control unit according to the embodiment 5 of the present invention, where a clipping position of an FFT window is altered.

FIG. 16 is a diagram illustrating an operation of the window control unit 2 according to the embodiment 5, where a clipping position of an FFT window is altered. A left side of the diagram in FIG. 16 shows outputs from the signal delaying unit 25 in FIG. 13. A right side of the diagram in FIG. 16 shows the delay signals outputted from the signal delaying unit 25 switched by the switch 262 of the signal switching unit 26. Here, a signal of the input data 0 is moved before the input signal 4. At this time, a boundary between the input data 0 and the input data 4 becomes a signal switching position, and allows backward movement of the position of the FFT window. However, since a position of a symbol header (a reference point of the FFT window) does not change, phase rotation does not occur on the frequency domain.

The FFT unit 3 performs the FFT to a signal (FFT data) resulted from recombination in an order of output data 4 at the beginning, output data 3, output data 2, and output data 1 shown on the right side of FIGS. 15 and 16. Therefore, in the receiving apparatus according to the embodiment 5, the FFT window may be moved by ±¼ effective symbol.

From the aforementioned description, the receiving apparatus according to the embodiment 5 may provide the same effects as those of the embodiments 1-4.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1 QUADRATURE DEMODULATION UNIT
2 WINDOW CONTROL UNIT
3 FFT UNIT
4 DATA DECODING UNIT
5 TRANSMISSION CHANNEL ESTIMATION AND CORRECTION UNIT
6 ERROR CORRECTING UNIT
21 SIGNAL DELAYING UNIT
22 SIGNAL SWITCHING UNIT
23 SIGNAL DELAYING UNIT
24 SIGNAL SWITCHING UNIT
25 SIGNAL DELAYING UNIT
26 SIGNAL SWITCHING UNIT
211-214 DELAYING UNIT
221 SWITCH
231, 232 DELAYING UNIT
241 SWITCH
251-255 DELAYING UNIT
261, 262 SWITCH

The invention claimed is:

1. A receiving apparatus for receiving an orthogonal frequency division multiplexing (OFDM) modulated signal modulated based on an OFDM method, and generating decoded data obtained by decoding the OFDM modulated signal, the apparatus comprising:
a quadrature demodulator that receives a signal obtained by converting said OFDM modulated signal into a predetermined frequency band, and performs quadrature demodulation on a time domain of said OFDM modulated signal to output a time domain signal;
a window controller that positions a fast fourier transform (FFT) window in which FFT is performed to said time domain signal outputted from said quadrature demodulator, and outputs FFT data corresponding to the FFT window;
an fast fourier transformer that performs FFT to said FFT data outputted from said window controller, and output frequency domain data; and
a decoder configured to decode said frequency domain data outputted from said fast fourier transformer, wherein
said window controller includes:
a signal delayer that generates, from said time domain signal, a plurality of delay signals with different delay amounts; and
a signal switcher that outputs, by switching between two signals different in delay amount by a single effective symbol in said time domain signal and said plurality of delay signals based on a predetermined switch timing, said FFT data including the output signal of the switch.

2. The receiving apparatus according to claim 1, further comprising:
a transmission channel estimator that estimate distortion of said OFDM modulated signal produced in a transmission channel based on said frequency domain data outputted from said fast fourier transformer, wherein
said window controller controls said switch timing based on a result estimated by said transmission channel estimator.

3. The receiving apparatus according to claim 1, wherein said decoder includes an error corrector that corrects an error of said OFDM modulated signal and output said decoded data, and
said window controller controls said switch timing based on a correction amount obtained by said error corrector.

4. The receiving apparatus according to claim 1, wherein said signal delayer includes a plurality of series-connected delayers that respectively output said plurality of delay signals.

5. The receiving apparatus according to claim 1, wherein said window controller controls the position of said FFT window using as a reference a symbol header indicating a beginning of a predetermined symbol included in said time domain signal.

6. A receiving method for receiving an orthogonal frequency division multiplexing (OFDM) modulated signal modulated based on an OFDM method, and generating decoded data obtained by decoding the OFDM modulated signal, the method comprising:
(a) a step of receiving a signal obtained by converting said OFDM modulated signal into a predetermined frequency band, and performing quadrature demodulation on a time domain of said OFDM modulated signal to output a time domain signal;
(b) a step of controlling a position of a fast fourier transform (FFT) window in which FFT is performed to said time domain signal outputted in said step (a), and outputting FFT data corresponding to the FFT window;
(c) a step of performing FFT to said FFT data outputted in said step (b), and outputting frequency domain data; and
(d) a step of decoding said frequency domain data outputted in said step (c), wherein said step (b) includes:
(e) a step of generating, from said time domain signal, a plurality of delay signals with different delay amounts; and
(f) a step of outputting said FFT data including an output signal that has been outputted by switching between two signals different in delay amount by a single effective symbol in said time domain signal and said plurality of delay signals based on a predetermined switch timing.

7. The receiving method according to claim 6, wherein
(g) a step of estimating distortion of said OFDM modulated signal produced in a transmission channel based on said frequency domain data outputted in said step (c), wherein in said step (b), said switch timing is controlled based on a result estimated in said step (g).

8. The receiving method according to claim 6, wherein said step (d) includes:
 (h) a step of correcting an error of said OFDM modulated signal and outputting said decoded data, and
in said step (b), said switch timing is controlled based on a correction amount obtained in said step (h).

9. The receiving method according to claim 6, wherein said step (e) includes:
 (i) a plurality of series-connected steps of respectively outputting said plurality of delay signals.

10. The receiving method according to claim 6, wherein in said step (b), the position of said FFT window is controlled using a symbol header indicating a beginning of a predetermined symbol included in said time domain signal.

* * * * *